United States Patent [19]

Lester

[11] 4,378,956
[45] Apr. 5, 1983

[54] DIRECT IMAGING OF INFORMATION USING LIGHT PIPE DISPLAYS

[76] Inventor: Robert W. Lester, 46 Abbey Rd., Munsey Park, Manhasset, N.Y. 11030

[21] Appl. No.: 156,821

[22] Filed: Jun. 5, 1980

[51] Int. Cl.³ .................. G03B 41/00; G03B 27/00
[52] U.S. Cl. .................... 355/3 R; 346/107 R; 354/6
[58] Field of Search ............ 355/1, 3 R, 7; 354/4, 354/5, 6, 7; 346/107 R, 108, 1.1

[56] References Cited

U.S. PATENT DOCUMENTS

| | | | |
|---|---|---|---|
| 3,435,222 | 3/1969 | Hotine | 355/1 X |
| 3,824,604 | 7/1974 | Stein | 354/5 |
| 3,832,488 | 8/1974 | Fahey et al. | 354/5 X |
| 3,836,917 | 9/1974 | Mee | 354/5 |
| 3,896,452 | 7/1975 | Brown | 355/3 R X |
| 3,952,311 | 4/1976 | Lapeyre | 354/5 |
| 4,050,811 | 9/1977 | Russell | 346/107 R X |
| 4,080,058 | 3/1978 | Stephany et al. | 355/3 R X |
| 4,090,206 | 5/1978 | Pfeifer et al. | 346/1.1 X |
| 4,096,486 | 6/1978 | Pfeifer et al. | 354/5 X |
| 4,107,687 | 8/1978 | Pfeifer et al. | 346/107 R |
| 4,110,794 | 8/1978 | Lester et al. | 354/5 X |
| 4,194,833 | 3/1980 | Lester et al. | 355/67 X |
| 4,198,158 | 4/1980 | Knowlton | 354/5 X |
| 4,255,042 | 3/1981 | Armitage, Jr. et al. | 355/70 X |

FOREIGN PATENT DOCUMENTS 1091781 10/1960 Fed. Rep. of Germany ...... 346/107

OTHER PUBLICATIONS

"Liquid Crystal Display Device"—G. L. Gladstone et al.; IBM Bulletin vol. 15, No. 2, Jul. 1972 pp. 437–438.
"Optical Printer"—T. J. Harris; IBM Bulletin vol. 13, No. 12, May, 1971, pp. 3757–3758.

*Primary Examiner*—J. V. Truhe
*Assistant Examiner*—Richard M. Moose
*Attorney, Agent, or Firm*—Collard, Roe & Malcolm

[57] ABSTRACT

A light pipe information display, having a non-conductive, transparent planar first glass sheet and a non-conductive planar opaque second glass sheet, both sheets being disposed adjacent to one another with their inner surfaces opposing one another in spaced-apart relationship. The second non-conductive sheet has a plurality of discrete transparent light pipes formed therethrough, wherein at least one of said non-conductive sheets includes electrical conductors disposed on its inner surface. The conductors are connected to an electrically responsive display material, such as a liquid crystal or electroluminescent material disposed between the first and second sheets, arranged in discrete character-forming segments. Each segment is aligned with one of said discrete light pipes. There is a third opaque sheet disposed on the exposed surface of the second sheet and includes a plurality of smaller light pipe holes, each hole being aligned with each light pipe window of the second sheet. The third sheet has a concave outer surface to conform to the drum of a standard dry copy photocopy machine. Programmed electrical circuits provide scrolling of the images produced on the display in step with the movement of the drum. The dot segments are staggered in the scrolling direction of the drum, on the surface of the display, so that high resolution, non-segmented images can be produced.

10 Claims, 10 Drawing Figures

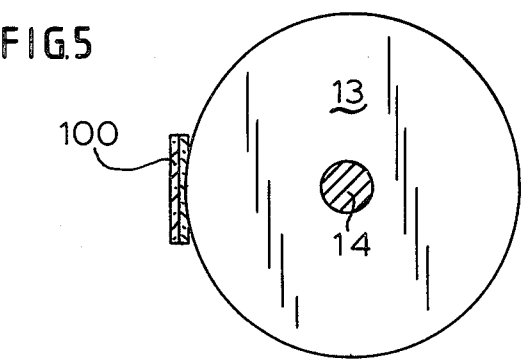
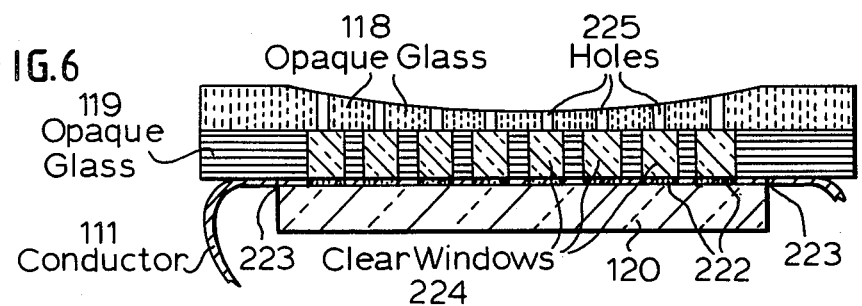
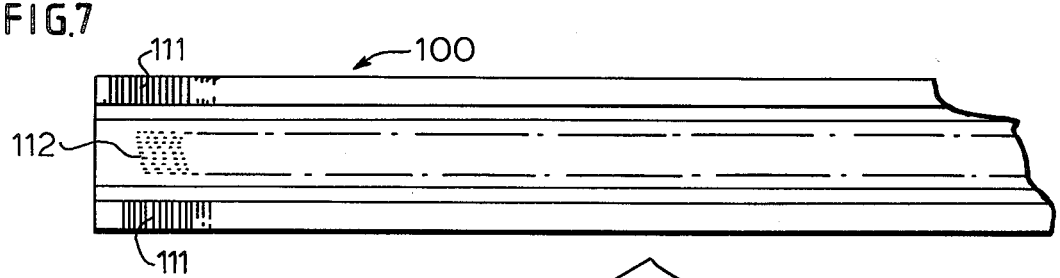
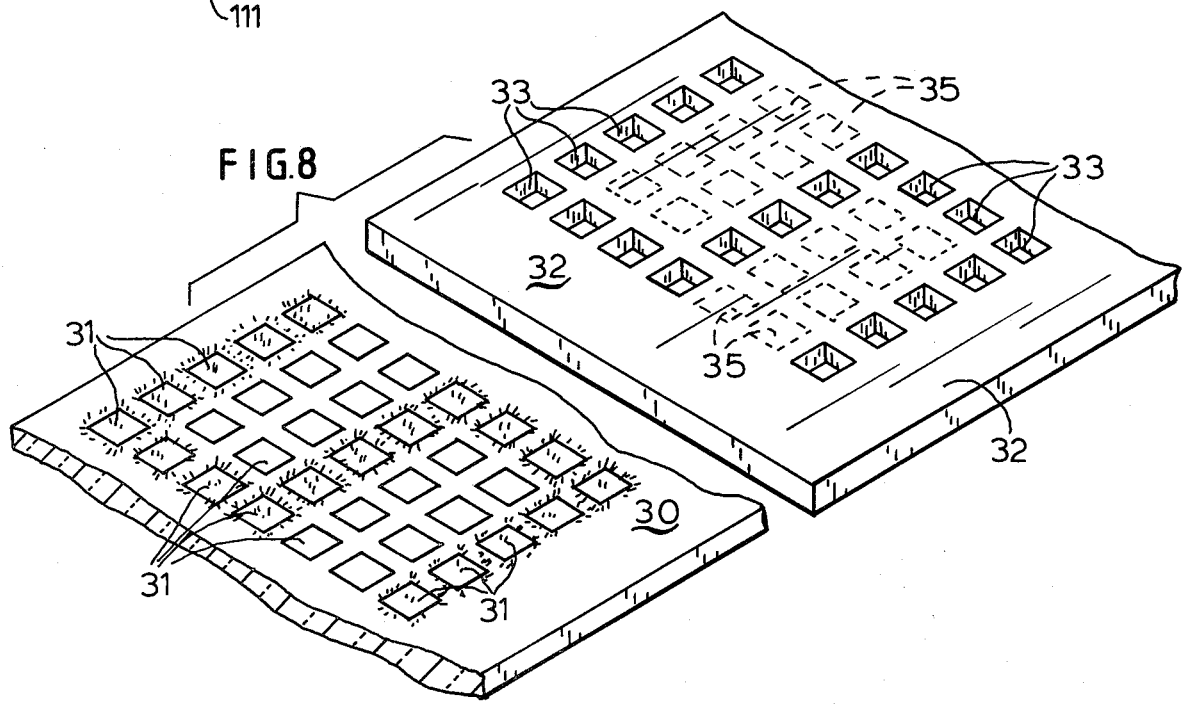

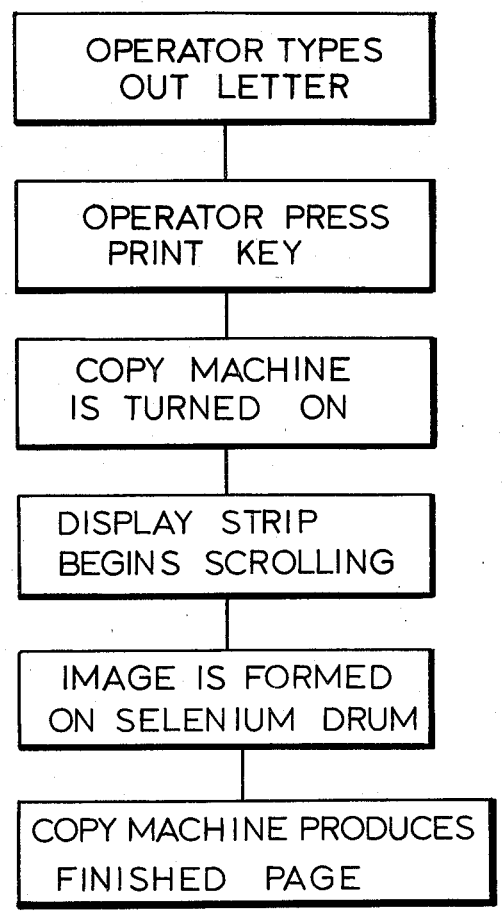
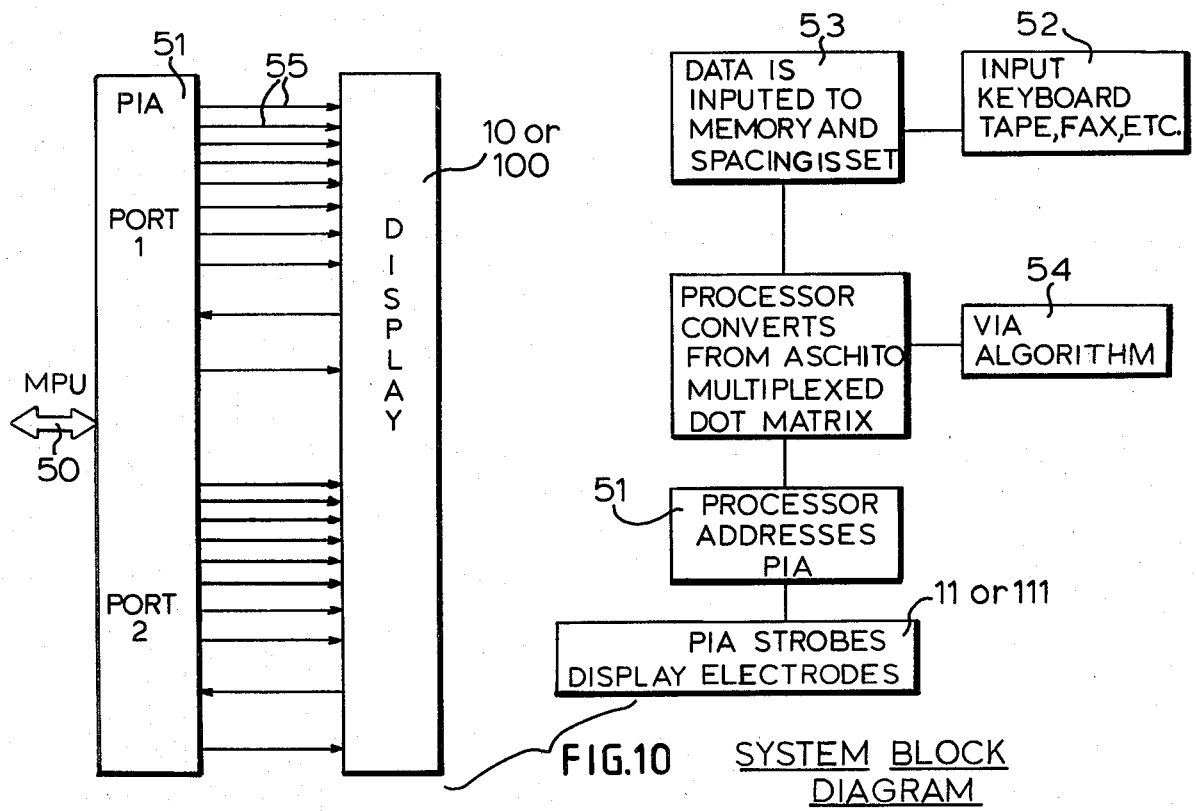

DIRECT IMAGING OF INFORMATION USING LIGHT PIPE DISPLAYS

BACKGROUND AND SUMMARY OF THE INVENTION

This invention relates to a visual display device, and an electronic solid state printer using a liquid crystal or electroluminescent display direct imaging strip in cooperation with a copy machine, to produce a finished copy.

More specifically, this invention relates to an electronic printer which uses either a liquid crystal transmissive display strip or an electroluminescent display strip with light pipe valves for direct imaging on a copy machine, whereby the electroluminescent or liquid crystal light pipe strip is scrolled in synchronism with the sweep of the copy machine to produce a printed copy.

Word processing machines, such as typewriters with stored memories first became available to the public during the middle 1960's. IBM Corporation developed the MTST Model having a single or dual tape drive, which was capable of receiving programmed information from a typewriter and allowing corrections to be made to the program before the final copy was typed. A number of other manufacturers, such as Remington, Redactron, Sabin, as well as IBM, also began producing magnetic card typewriters having single and dual card capability. The typed information was stored on one or more magnetic cards, and could be recalled by inserting the card into a card reader at any time. Suitable corrections could be made to the text of the card, so that the machines removed the necessity of expensive proof reading of the final material, once minor corrections were made to the original copy. More sophisticated word processing machines have also been developed, using a particular full-page CRT (cathode ray tube) display, such as the Vydec and Wang apparatus. This allow a full video display of the typed information before it is transcribed on paper.

There is also a Xerox 1200 Model, which consists of a binary-information-fed or serially-fed photocopy machine which, however, employs many moving parts, including a character-generating drum moving at high speed inside the selenium reproduction drum. The character drum works in combination with a photo-optical generator for reproducing the images on the reverse side of the selenium drum, so that they can be printed after suitable dusting and heat. The images produced by this Xerox method are blurred; and this differs from the present invention, which does not have any moving parts or any noise, since it is entirely electronic in its character generation.

Almost all of the above machines require the use of a mechanical printing device for transcribing the recorded information onto a printed page. Some of the word processing devices use a heavy duty IBM Selectric typewriter, whereas others use a high speed daisy wheel printer capable of printing approximately 500 words per minute. Newer printers are now available using an ink spray deposit method in an attempt to improve the speed of the printout. However, where a large number of pages have to be reproduced from stored information, the operator of the word processing machine remains idle for long periods of time until the mechanical printing device can complete the transfer of the information from a memory disc or tape to the printed page.

The conventional word processing machines also suffer from the disadvantage that the mechanical printers are subject to breakdown and require frequent repairs or adjustments during a heavy duty operation. The mechanical printing portion of the word processing machines also represents a substantial cost of the word processor, so that the price to purchase some of the conventional word processors runs between $10,000 to $18,000. Moreover, the average cost of typewriter ribbons for each mechanical printer runs between $200.00 to $500.00 per year, an expense that is eliminated by the present invention.

DISCUSSION OF PRIOR ART

There have also been proposed various other prior art devices for printing using liquid crystal elements which employ complex and expensive machinery. Such devices are described in U.S. Pat. Nos. 3,824,604, 3,610,730, 3,982,831 and 4,080,058.

In my earlier U.S. Pat. No. 4,194,833, issued Mar. 25, 1980, entitled, "Electronic Typewriter Having an Electronic Display," an electronic typewriter having a LCD strip was disclosed, wherein the row of dots forming the images were projected by mirrors onto the photosensitive drum by reflected light. In my latest U.S. Pat. No. 4,297,022, issued Oct. 27, 1981, the same type of scrolling techniques and electronic circuitry as in U.S. Pat. No. 4,194,833 were used. However, this application used the direct imaging of the LCD strip onto the drums, so that there was an elimination of lens and mirrors, and an improved clarity and sharpness of the character images when printed by the photosensitive drum.

BRIEF SUMMARY OF THE INVENTION

Accordingly, in a manner similar to U.S. Pat. No. 4,297,022, the present invention provides a display and an electronic printer which can be electrically coupled to a computer or typewriter output, and has an electroluminescent or liquid crystal light pipe display (LCD). The display consists of an electroluminescent or transmissive liquid crystal light pipe glass material sandwiched to a light pipe valve that is disposed adjacent to the drum of a standard copy machine, such as a plain paper copier, for reproducing graphics or alphanumeric characters. The electroluminescent display produces its own brightness, whereas the LC display is illuminated from the rear by a sealed leakproof light box. In the invention, an electronic keyboard of a typewriter or a computer program is used to prepare a letter or report. The alphanumeric letters which are produced are also displayed on a screen either adjacent to or mounted on the typewriter or computer, so that suitable corrections and additions can be made to the text before it is finalized. After the text is in final form, a print button on the typewriter or computer is depressed and the complete text is scrolled line-by-line across the electroluminescent or LC display screen, and viewed by the copier drum.

In the present invention, the imaging of characters or graphics onto a photosensitive surface is performed without lenses or mirrors. The liquid crystal light pipe display is light transmissive and is placed in almost direct contact with the photosensitive surface. Likewise, the non-transmissive electroluminescent light pipe display, which is self-illuminating, is placed in almost direct contact with the photosensitive surface. Since the LC or electroluminescent light pipe display is disposed inside a single or double layer of glass, the LC crystals or electroluminescent material of the light pipe display which form the images, would be out of focus and bloom out the image when it is either illuminated from the rear portion or generated by electroluminescence. According to the invention, the glass layer adjacent to the photosensitive surface consists of a light pipe valve formed of a sheet of opaque material, such as glass, having one or more rows of clear apertures. For the LC display, a conductive electrical LC etching is formed covering each light pipe so as to block out any light leakage to the adjacent aperture when the liquid crystal is energized. The apertures thus act as camera shutters to block out the transmissive light source from reaching the photoconductive surface when the LC turns opaque. When the light pipe valve is placed very close or in direct contact with the photosensitive surface, the images formed by the "open" apertures of the light pipe valve are in sharp focus, with little or no image blooming.

The basic LC cell has no readily discernible optical characteristics and looks transparent. If a properly oriented piece of linear polarizer is placed on each glass surface, the basis of the cell's display properties is provided. The top filter lets in light with a particular orientation; the LC material shifts this light 90 degrees. If the bottom filter is skewed 90 degrees with respect to the top filter, this twisted light is in phase with the bottom filter, and thus passes freely through the cell, which thus still looks perfectly transparent.

When a voltage is applied to electrodes placed across such a cell, the LC material's molecules line up between the electrodes. Because of the material's purity, only a small leakage current (20 nA) keeps them positioned this way. Positioned on the LC sandwich, these energized electrodes disrupt the spiral staircase. Light passing through the sandwich is now improperly oriented with respect to the bottom polarizing filter; the bottom polarizer absorbs the light in the regions between the electrodes. The resulting dark-on-light display provides legibility over wide angles in a wide range of ambient light conditions. In effect, energizing the electrodes with a microwatt or so of power is equivalent to turning portions of the polarizing filters 90 degrees with respect to each other.

In one embodiment, the LC or electroluminescent display strip preferably forms rows of spaced-apart dots, and is coupled by a peripheral interface adapter, to a memory, such as a RAM, and to a microprocessor. By strobing each electrode connected to the row of dots of the LC strip or electroluminescent display, an image is formed on the display. In order to produce a clear image on a xerographic type copy machine where a selenium drum is used to record the image as the drum rotates, the original text has to be scrolled at a rate that is synchronous with the rotation of the drum. As the drum rotates, it must record a different part of the image on each part of its surface. In the present invention, the original document consists of an LC or electroluminescent strip with a light pipe valve panel, which is held stationary adjacent to the photosensitive selenium drum.

It is therefore an object according to the present invention to provide an electronic solid state printer using a liquid crystal or electroluminescent light pipe display strip, which is capable of directly imaging alphanumeric indicia onto a photocopy machine.

It is another object according to the present invention to provide an electronic solid state printer with a liquid crystal or electroluminescent display strip, which is simple in design, easy to construct and reliable in operation.

Other objects and features of the present invention will become apparent from the following detailed description considered in connection with the accompanying drawings, which disclose the embodiments of the invention. It is to be understood, however, that the drawings are designed for the purpose of illustration only, and not as a definition of the limits of the invention.

BRIEF DESCRIPTION OF THE DRAWINGS

In the drawings, wherein similar reference characters denote similar elements through the several views:

FIG. 5 is an end view of another embodiment of the invention, using an electroluminescent strip combined with the light pipe valve element, and coupled to the drum of a photocopy machine;

FIG. 6 is a detailed, cross-sectional view of one embodiment of FIG. 5 of the electroluminescent light pipe valve panel, using a staggered row of dots for image forming, according to the invention;

FIG. 7 is a top plan view of the display strip of FIG. 6, using staggered rows of electroluminescent dots;

FIG. 8 is a plan view of a display strip section, partly in perspective, of another embodiment of the invention showing a light pipe electroluminescent display panel, using a 5×7 dot matrix for either direct imaging or visual applications;

FIG. 9 is a flow diagram describing the sequence of operations of the displays in a solid state printer; and FIG. 10 is an electrical block diagram showing the operation of the displays in the system.

DESCRIPTION OF THE PREFERRED EMBODIMENTS

Figure 3:
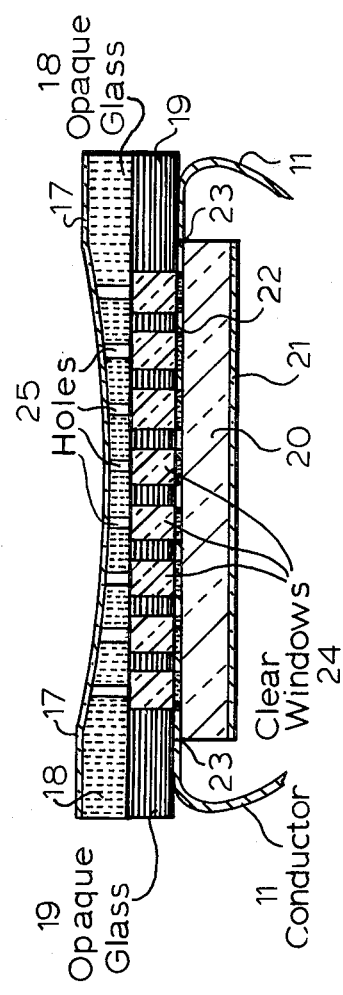
FIG. 3 is a detailed, cross-sectional view of one embodiment of FIG. 1 of the LC light pipe valve panel, using a staggered row of dots for image forming, according to the invention.

Referring now to FIGS. 1-4, there is shown the full line display 10, having a plurality of staggered dots 12 and a plurality of electrical conductors 11, connecting to each of the staggered dots from both sides of the display. The liquid crystal light pipe display as shown in the detailed cross-sectional view of FIG. 3, comprises a sandwich of a first glass panel 20, constructed of clear glass bonded to a opaque glass panel 19, having a plurality of clear windows 24 formed therein. Panel 19 is preferably opaque, except for the plurality of light pipe openings, which are preferably spaced apart across its surface. Disposed on each light pipe opening is a conductive electrical coating 22 in the form of a dot or square, which is electrically connected to conductors 11 at the edges of the glass. Clear panel 20 also includes a similar conductive electrical coating in the form of a dot or square in registration with the dots or squares of opaque panel 19, and also connected to conductors 11. A liquid crystal material is disposed between the mating surface of panels 19 and 20, and both panels are sealed by means of seal 23. A second opaque glass panel 18 is secured over the first opaque glass panel 19 and also includes a plurality of light pipe holes, which are considerably smaller than the light pipe windows 24, formed in opaque glass 19. Each of holes 25 are in registration with light pipe windows 24, as shown in more detail in FIG. 4. A thin polarizer 17 is bonded to the top surface of opaque glass panel 18, and a second polarizer 21 is bonded to the bottom surface of glass panel 20. Opaque glass 18 is made slightly concave, so as to have a circular indentation with a radius similar or identical to the radius of photosensitive drum 13, used in a standard dry copy photo machine. The drum is made to pivot on axis 14, as shown in detail in FIG. 2.

Figure 2:
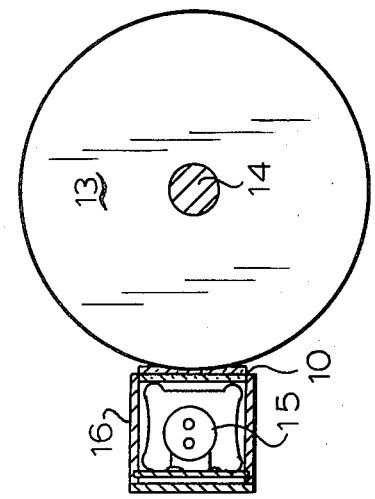
FIG. 2 is an end view, of the solid state display strip, used for direct imaging onto the photo-sensitive drum, according to the invention.

The liquid crystal light pipe panel 10 is mounted preferably on the front surface of an elongated housing 16, and is directed in close proximity to the photosensitive surface of drum 13, as shown in detail in FIG. 2. Lamp 15, which may be a strobe light, electroluminescent panel or a florescent bulb, is used to backlight the liquid crystal display panel, so that the illumination will pass through polarizer 21, clear glass panel 20, conductive coating 22, light pipe openings 24, holes 25 and polarizer 17.

The conductive electrical coating is designed to cover each light pipe so as to block out any light leakage to the adjacent aperture when the liquid crystal is energized. The windows 24 thus act as camera shutters to block out the transmissive light source from reaching the photoconductive surface when the LC turns opaque. When the light pipe display is placed very close or in direct contact with the photosensitive surface, the images formed by the "open" apertures of the light pipe valve are in sharp focus, with little or no image blooming.

Figure 1:
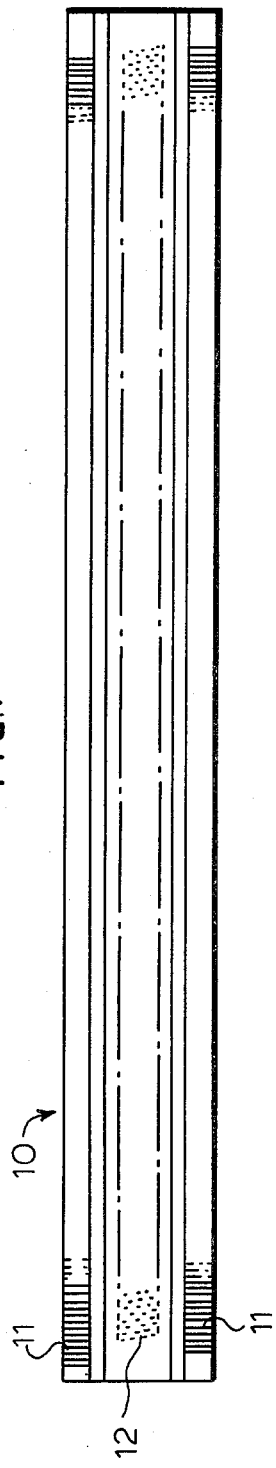
FIG. 1 is a top plan view showing the solid state display strip of one embodiment of the present invention.
Figure 4:
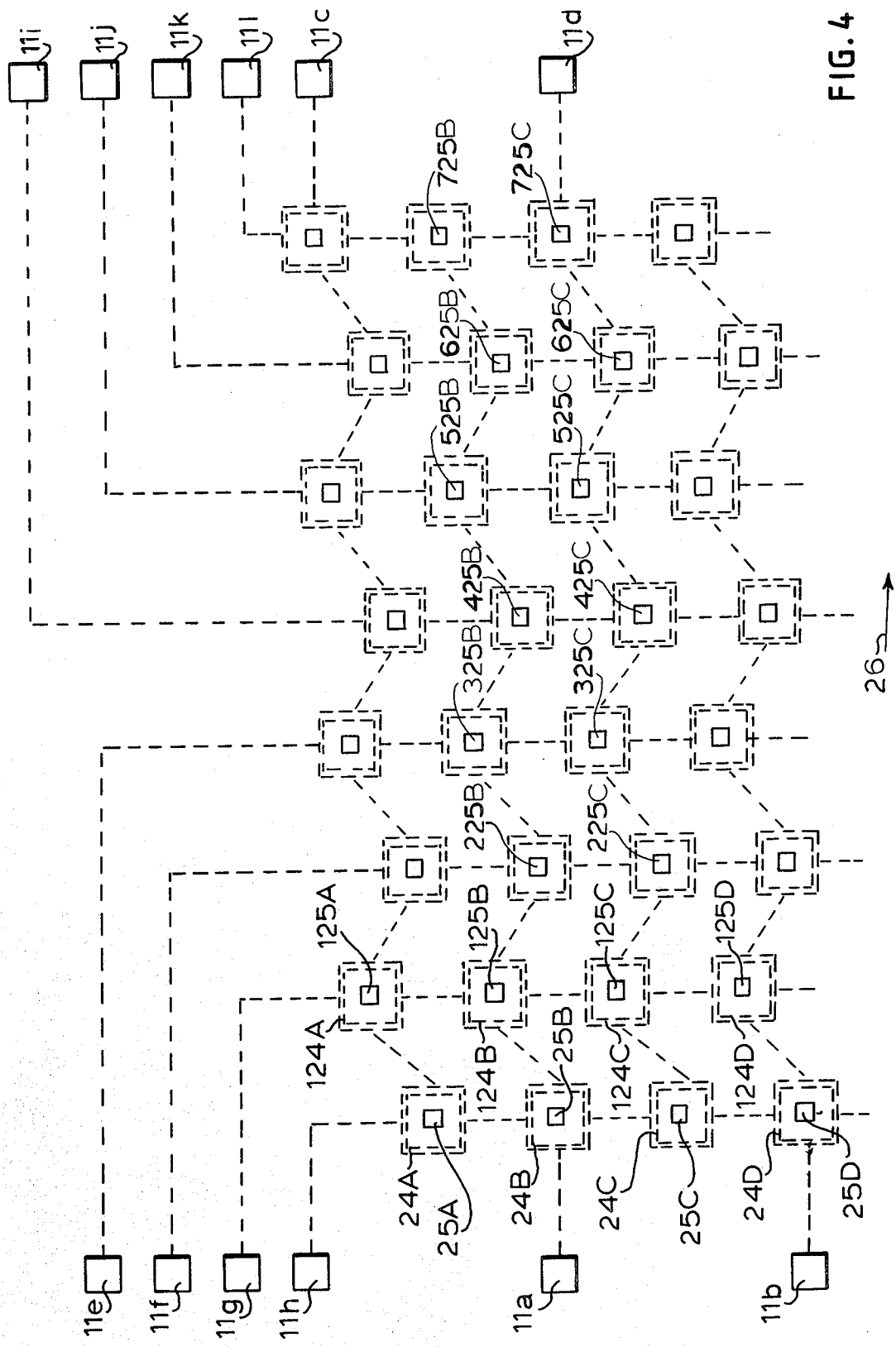
FIG. 4 is a detailed plan view, showing the electrical connections to each pipe valve element used in the present invention.

The display of FIGS. 1–4 was designed primarily for imaging by scrolling on photocopy machines. The first column of dots in FIG. 4, shown as four dots 24A, are spaced apart across panel 10, transverse to the direction of scrolling. Arrow 26 denotes the direction of scrolling. A second column of dots 124A are displaced in the direction of scrolling of the photocopy machine, and are in scrolling alignment with the blank spaces formed between the first column of dots 24A. Associated with dot 24A are a series of three additional dots 24B, 24C and 24D, each disposed in a direction of scrolling and staggered transversely with respect to this direction, by approximately 25% of the diameter or width of the dot. In a similar manner, dot 124A is associated with three successive dots 124B, 124C and 124D, which are also spaced apart in the direction of scrolling, and staggered transversely to that direction by approximately 25% of their width or diameter. All of the dots 24A, B, C and D and 124A, B, C and D, are connected electrically through conductors, which are brought out as contact 11s on both sides of the display strip, as shown in FIG. 1. Practically speaking, the electrical contacts 11 on each side of the display should not exceed 30 to the inch along each edge. Contacts exceeding 30-to-the-inch on either side of the display can give problems, and are limited to a density only slightly above this number.

However, only 15 contacts per inch are needed on each side of the display to provide for a 240-dot-per-inch resolution display. Obviously, 30 contacts to the inch would allow greater dot density. Contacts 11a, b, c, d, e, etc., connect in a zig-zag manner in the direction of scrolling, to alternate chains of dots. Individual contacts 11e, f, g, h, i, j, k and l connect each straight line set of dots extending transversely to the direction 26 of scrolling.

The 30-dots-per-inch etching is done on a light pipe glass, creating an egg crate effect, as shown in detail in FIG. 3, which prevents light cross-talk between dots. Disposed on top of the light pipe dots 24 and 124, is the second panel of opaque glass 18, constructed of a Fotoform glass with holes, preferably 1/240th of an inch in diameter or width, each hole being one-quarter the size of the light pipe dots. These smaller holes are aligned so as to be in the center of the light pipe windows of opaque layer 19. Each of the small holes is staggered in the direction of scrolling, in order to allow a sufficient amount of space required for the light pipe conductors and windows 24a–d. The end result of the design of FIG. 4 is to provide for graphic reproduction of 240 dots to the inch, having a one-thousandth-of-an-inch overlap, so that a solid line can be reproduced on the photosensitive surface of drum 13.

The speed of the copier drum is preferably synchronized to the scrolling speed of the liquid crystal display. The surface of the opaque Fotoform glass layer 18, being concave and positioned within a few thousandths of an inch from the drum, creates images in sharp focus on the surface of the drum. The square light pipe dots appear as images on the top surface of Fotoform opaque glass 18, so that there is direct imaging of these dots onto the photosensitive surface of the drum without optics.

Referring to FIGS. 5–7, there is shown another embodiment of the invention similar to that shown in FIGS. 1–4, except that electroluminescent dots 222 are used in place of liquid crystal dots, for producing the display images. Panel 100, as shown in detail in FIG. 7, includes a plurality of conductors 111, on both sides of the panel, connected to electroluminescent dots 212, which are staggered in the direction of scrolling, in a manner identical to that shown with respect to FIG. 4. Since the electroluminescent dots glow with their own brightness when energized, there is no need to provide any backlighting or external illumination to clear glass panel 120. The electroluminescent dots are electrically connected to each of the conductor pairs 111 in a manner similar to the connection of the liquid crystal display dots of FIG. 4, and are aligned under each of the light pipe windows 224, formed in opaque glass 119. The second opaque glass or Fotoform glass 118 contains light pipe holes 225, which are preferably one-quarter the size of light pipe windows 224, and are preferably mounted in the center of the windows in a manner similar to that with respect to FIG. 4, including being staggered to overlap when printed. Thus, when display 100, containing clear glass panel 120 and opaque glass panels 118 and 119, are placed in close proximity to the photoconductive surface of drum 13 and the electroluminescent dots are energized, alphanumeric images can thus be formed on the photoconductive surface, without any segmentation.

Opaque glass 118 is preferably formed with a concave outer surface, similar to that of opaque glass 18 of FIG. 3, the diameter of the concave surface preferably being the same as the diameter of drum 13, so that the glass can be placed within one- or two-thousandths of an inch, with respect to the photosensitive surface of the drum. This permits direct imaging of the electroluminescent dots through light pipe windows 224 and holes 225, without any appreciable blooming or optical distortion.

FIG. 8 shows another embodiment of the invention, which consists of a matrix display on panel 30, having a plurality of electroluminescent dots 31 formed thereon, for producing display letters by electrically activating selected dots for particular alphanumeric letters. A second glass panel 32 is secured over panel 30, and includes a plurality of light pipe windows 33. Glass panel 32 is preferably opaque, so that the only image that is shown is that of the alphanumeric letter which is produced by the electroluminescent dots, when energized. In the case of FIG. 8, the letter "S" is formed on a 5×7 matrix by illuminating selective electroluminescent dots, and only those dots appear on the surface of opaque glass 32 in the form of the letters "S," since the non-illuminated windows 35 are almost invisible due to the opaque background. The display panel of FIG. 8, which can be made in any size with any number of letters, will produce very clear and sharp alphanumeric or graphic images, without distortion or excessive blooming, since the letters are produced through light pipe windows in opaque panel 32. The embodiment of FIG. 8 can be constructed in any size as a full screen for visual display or for imaging on flat bed copiers, as opposed to drum type copiers.

FIG. 9 illustrates how the display of the invention works in cooperation with an ASCHII keyboard. After the operator types out the letter and then presses a print key on the keyboard, the copy machine is turned on and the LC or electroluminescent display begins scrolling the alphanumeric display from the first line to the last line of the typed letter. The image is continuously formed on the selenium drum of the copy machine and, at the end of the scrolling, the machine produces the finished page.

FIG. 10 is an electrical block diagram showing the operation of the system. Microprocessor unit 50, which is fed from typewriter keyboard 52, will drive peripheral interface adapter (PIA) 51, which is interconnected to display strip 10 or 100, for displaying the alphanumeric or graphic images. In the system, block diagram, the input keyboard 52, which could also be a tape or facsimile input, feeds into a memory circuit 53, so that the data is stored and spaced in the memory. Microprocessor 50 converts the keyboard indicia from the memory to a multiplexed dot matrix for scrolling by comparison with an algorithm 54. The processor then addresses PIA unit 51 via a bussline 40 and the PIA unit strobes displays 10 or 100 over conductors 55, for producing the scrolled alphanumeric indicia.

In order to produce a clear image on a xerographic type copy machine where a selenium drum is used to record the image as the drum rotates, the original text has to be scrolled at a rate that is synchronous with the rotation of the drum. As the drum rotates, it must record a different part of the image on each part of its surface. In the present invention, the original document consists of an LC or electroluminescent light pipe display 10, or 100, which is held stationary adjacent to the photosensitive selenium drum. In order to recreate the original copy from the display, a technique is used called "upshift character line mode". This is basically a modified scrolling of the character line on the display.

In order to form the alphanumeric characters for imaging onto the photosensitive drum, a program is written for the CPU defining the formation of the letter across the dot matrix of the liquid crystal or electroluminescent display. For example, to form the letter "I" with the top and bottom having cross bars, on the configuration of FIG. 4, initially the three dot segments 24A, 24B and 24C are energized by signals being applied to contacts 11c–11h, 11a–11h and 11d–11h, respectively. These dot segments 24A, 24B and 24C cause dots 25A, 25B and 25C to be illuminated, so that the dots will form latent dot images on the surface of photosensitive drum 13.

Dot 25B can be left turned on as the scrolling takes place, but dots 25A and 25C are turned off quickly after the dots have been imaged onto the surface of the drum. Depending upon the speed of the moving drum, the dots can be flashed on and off in one millisecond or less, so that there is little or no streaking of the images formed by the dots, due to the motion of the drum.

When the latent images of the first row of dots 25A, 25B and 25C formed on the drum, move to the position of the second line of dots 125A-D, dot segments 124B and 124C are energized so that dots 125B and 125C can be produced as latents images on the drum, to fill in the spaces between the latent images of dots 125A-C previously formed. The CPU performs these functions by energizing selected terminals 11a, 11b, 11c, etc., to perform these functions.

As all of the latent images are then moved into the position of dots 225B and 225C, these dots are turned on to fill in the additional spaces between the already-formed latent images resulting from dots 25A, 25B, 25C, 125B and 125C.

Anticipating that there will be a formation of the stem of the "I," dot 225B is left turned on, together with dot 25B, since dot 225B is the next dot that is adjacent on the upper edge of dot 25B. Since the dots are designed with a small overlap, all of the dots formed as latent images on the surface of the photosensitive drum, in order to make the top cross bar of the letter "I" will be joined together without any discrete segmentation.

In a similar manner, as the drum rotates the already-formed latent images from the dots of the first three columns, dots 325B and 325C will be flashed on and off, to additionally fill in more of the blank spaces to form the top cross bar of the letter "I". Likewise, dots 425B, 425C, 525B, 525C, 625B, 625C, 725B and 725C will be selectively energized in their respective turn, to completely block in the cross bar of the letter "I".

In the preferred design of the apparatus, dot segments 24A and 24B are separated by approximately 1/30th of an inch, so that the total width between segments 24A to 24C will be 1/15th of an inch wide, which will be the approximate width of the top cross bar of the letter "I".

In continuing the formation of the stem of the letter "I", dots 25B, its adjacent upper dot 225B and its adjacent lower dot 725C are left turned on, so as to streak a latent image three dots wide without segmentation, across the surface of the moving drum in its scrolling direction, for a time interval depending upon the font and size of the letter to be formed.

In order to form the bottom cross bar of the letter "I", a similar imaging sequence is performed by the dot matrix of FIG. 24, as a result of signal instructions from the CPU.

Since there is a possibility of up to 240 dots-per-inch of resolution in the preferred embodiment of the invention, the apparatus can also produce graphic images and photographs of high quality, without the appearance of segmentation between the dots. Moreover, the CPU can control the intensity of each of the individual latent images of the dots formed on the surface of the photosensitive drum, so that half-tone pictures are possible.

The operation of the invention works for both liquid crystal displays and electroluminescent displays. For electroluminescent displays, the dot segments are energized by power being applied across the electroluminescent material, causing it to glow. Recent technical advances in electroluminescent materials using rare earth elements have produced displays that glow with almost daylight brightness, and make them suitable for direct imaging onto photosensitive drums and surfaces. The conductors connecting to the electroluminescent segments do not have to be transparent as in the liquid crystal display, but can be plated to one mating surface of the glass panel, so as to interconnect to each segment.

The light pipe glass is produced by Corning Glass under their Trademark, Fotoform Process, using photosensitive glass. It was discovered that the glass portions which are exposed to ultraviolet light, become opaque, and the unexposed portions remain clear. By selectively exposing the photosensitive glass through a photographic mask, it has been found possible to form transparent light pipes through the entire thickness of the glass. The glass is then polished to have an optically flat surface for use with the liquid crystal or electro luminescent conductor. The glass should have a thickness sufficient to give it rigidity for use in the liquid crystal or electroluminescent element, and to create a sufficiently long tunnel path, so that the light will be directional toward the photosensitive surface. A light pipe having a thickness of 1/8th of an inch would have pipes several times longer than their width.

Another advantage of the present invention is that the size and style of type can be changed by changing the memory of the microprocessor, which would not be possible with a fixed 5×7 dot matrix. For example, in a short business letter, the lettering can be increased in size and separation. In the microprocessor can be stored the binary information relating to the style of type, such as Gothic or Roman style, so that the depressing of a particular key on the keyboard can set the particular style, and another key can set the size of the lettering, before the letter is printed.

With the use of bubble memory systems, it will also be possible to store large numbers of pages of written information, such as a multi-page report, which later can be recalled at any time, and rapidly reprinted sequentially.

While several embodiments of the present invention have been shown and described, it will be obvious to those persons of ordinary skill in the art, that many changes and modifications may be made thereunto, without departing from the spirit and scope of the invention.

What is claimed is:

1. A light pipe information display, comprising:
a non-conductive, transparent first sheet and a non-conductive substantially opaque second sheet, each having substantially planar inner and outer surfaces, said non-conductive sheets being disposed adjacent to one another with their inner surfaces opposing one another in spaced-apart relationship, said second non-conductive sheet having a plurality of discrete transparent light pipes formed therethrough, at least one of said non-conductive sheets including electrical conductors disposed on its inner surface thereof, said conductors being connected to an electroluminescent display material disposed between said first and second sheets, arranged in discrete character-forming segments, each segment of which is aligned with one of said discrete light pipes.

2. The display according to claim 1, wherein said first and second non-conductive sheets each comprise a glass sheet.

3. The display according to claim 1, wherein said character-forming segments and said discrete transparent light pipes, each have a similar configuration.

4. The display according to claim 3, wherein said character-forming segments are square-shaped and said transparent light pipes have a corresponding square-shaped cross-section.

5. The display according to claim 1, wherein each of said character-forming segments completely overlie their correspondingly aligned light pipes.

6. The display as recited in claim 1, additionally comprising a third substantially opaque sheet disposed on the exposed surface of said second sheet and including a plurality of light pipe holes formed therethrough, each aligned in registration with the light pipe windows of said second sheet, the holes having smaller apertures than said light pipe windows.

7. The display as recited in claim 6, wherein the exposed surface of said third sheet is concave.

8. The display as recited in claim 7, wherein said discrete character-forming segments are individually spaced-apart from each other, and arranged in a plurality of parallel spaced-apart columns, the individual character segments of one column being staggered with respect to the character segments of the adjacent column.

9. The display as recited in claim 8, wherein the character segments from column to column are laterally staggered so as to form overlapping dot images produced by the light pipe holes of the third sheet, the holes being laterally offset with respect to the holes of adjacent columns by the width of each hole, so that images without segmentation can be produced onto the surface of the drum.

10. The display according to claim 1, wherein said conductors include a plurality of contacts disposed along the edges of said non-conductive sheets and electrically connected to said character-forming segments.

* * * * *